Dec. 29, 1925.  
C. D. PAGE ET AL  
1,567,981  
RECORDING SYSTEM  
Filed May 9, 1924

WITNESSES  
INVENTOR  
CYRIL D. PAGE,  
FRANK A. BEHOUNEK,  
BY  
ATTORNEYS

Patented Dec. 29, 1925.

1,567,981

UNITED STATES PATENT OFFICE.

CYRIL D. PAGE AND FRANK A. BEHOUNEK, OF GRAND FORKS, NORTH DAKOTA.

RECORDING SYSTEM.

Application filed May 9, 1924. Serial No. 712,084.

*To all whom it may concern:*

Be it known that we, CYRIL D. PAGE and FRANK A. BEHOUNEK, citizens of the United States, and residents of Grand Forks, in the county of Grand Forks and State of North Dakota, have invented certain new and useful Improvements in Recording Systems, of which the following is a specification.

Our invention relates to improvements in systems for keeping a record of the steps in the manufacture of a specific article or any number of articles or in the performance of a given amount of work to the end that the cost of the finished product or of the performance of the work may be ascertained, and it consists in the combinations, constructions and arrangements herein described and claimed.

An object of the invention is to effect an economy in the use of blanks, time and labor to provide an accurate and complete record of the steps involved in the manufacture of an article or in the performance of given work.

A further object of the invention is to provide a system of the character described which comprises all the elements necessary for the provision of a complete, accurate and compact record which will afford a basis for the determination of the cost of a finished product or the performance of a certain work.

Other objects and advantages will be apparent from the following description, considered in conjunction with the accompanying drawings, in which—

Figure 1 is a plan view of one of the blanks or sheets which is comprised in the system.

Figure 2 is a plan view of a secondary blank or sheet which is comprised in the system.

The system embodying the invention comprises a main sheet or blank 1 and a secondary sheet 2. The main sheet 1 may be a rectangular sheet of paper or like material provided with spaced apart perforations 3 adjacent to the normally upper end thereof for the reception of the posts of an ordinary binder, not shown. The secondary sheet 2 may be a substantially rectangular card or the front portion of an envelope.

The main sheet 1 is divided by a vertical line 4 on the face thereof into two record sections designated respectively 5 and 6. The record section 5 is at the left hand side of the sheet 1 and has a width equal to that of the control sheet 2. The latter is shorter than the main sheet 1 and the section 5 therefore is divided by a transverse guide line 7 which is located adjacent to the lower end of the section 5 into an upper record space which is coextensive in area with the secondary sheet 2 and a lower record space. The main sheet 1 and the secondary sheet 2 bear the same index or identifying number or character, as for example "Nos. 21846" at the upper left hand side of the secondary sheet 2 and the same number within the lower space of the section 5 at the lower left hand corner of the main sheet 1.

The upper space of the section 5 and the secondary sheet 2 are provided with identical lines, captions and indicia so that corresponding lines, captions and indicia on the secondary sheet 2 and on the upper space of the section 5 will be in register or disposed one above the other when the control sheet 2 is disposed directly beneath the section 5 with the lower edge of the secondary sheet 2 flush with the guide line 7, the upper edge of the secondary sheet 2 flush with the upper edge of the section 5 and the respective side edges of the secondary sheet 2 flush with the corresponding side edges or lines of the section 5. The section 6 of the main sheet is provided with any desirable arrangement of vertical and horizontal lines or both vertical and horizontal lines to provide a desirable arrangement of lines and columns and also is provided with any desirable captions or indicia.

The particular main sheet 1 and secondary sheet 2 exhibited in the accompanying drawings are suitable for use by a printing establishment in keeping a record of the steps involved, material used, and the amount and cost of the labor required in the production of printed work. However, the main sheet 1 and the secondary sheet 2 may have suitable lines, columns, captions and other indicia thereon to adapt these sheets for use in any manufacturing, repairing or remodeling business where the basis of arriving at the cost of the finished product is determined by listing, extending and totaling the amount of materials used and the number of hours or other units of labor expended on a particular job or operation.

From the foregoing description of the various parts of the device, the operation thereof will be readily understood. A plurality of the main sheets 1 may be placed in an ordinary binder. One of the secondary sheets 2 is provided for each main sheet 1 and is arranged directly under the upper or order space of the section 5. This can be conveniently accomplished by arranging the secondary sheet so that the lower edge thereof is flush with the guide line 7 and the outer or left hand edge of the secondary sheet is flush with the corresponding edge of the main sheet. A sheet of carbon paper then is inserted between the secondary sheet 2 which is to be used and the overlying portion of the main sheet. It then will be manifest that when the order space of the section 5 of the main sheet is filled out to record a given order, the same order will be copied on the underlying secondary sheet 2. The latter may be termed a job sheet and is forwarded to the work shop to the end that the work may be commenced in accordance with the instructions and terms of the order. The main sheet remains at the business office of the user. At suitable times or intervals, the amount of labor and materials expended on the job are set out at the proper places in the section 6 of the main sheet. On completion of the work, the foreman or other employee at the shop marks the job sheet to show the date of completion of the work and the delivery of the finished article and returns the job sheet to the business office. The total labor, cost of other operations and materials expended on the job then may be extended and totaled on the section 6 and the total cost of the performance of the work thus determined. This affords a basis for the determination of the price which may be entered at a suitable place on both the main sheet 1 and the job sheet 2. From the main sheet, the required entry in the usual ledger of the user may be made and the complete main sheet 1 and job sheet 2 may be transferred to a record binder or stored for convenient record in any other suitable known manner.

From the foregoing, it will be apparent that the number of sheets required for the recordation of all the data required to provide a basis for the determination of the cost of producing a finished article or performing a given work is kept at a minimum and that considerable time and labor in the work of keeping such a record is saved in that the details of a given order are set out on both sheets in one operation and thereafter a complete history and record of a given work are kept on one sheet. This one or main sheet may be termed a summary sheet.

Obviously, our invention is susceptible of embodiment in forms other than that illustrated in the accompanying drawings and we therefore consider as our own all such modifications and adaptations of the form of the device herein described as fairly fall within the scope of the appended claim.

Having thus described the invention, what we claim is:—

In a recording system, a main sheet, a secondary sheet of less width and length than the main sheet, said main sheet having a vertical line produced on a face thereof at a distance from the lateral edge of the main sheet equal to the width of the secondary sheet, said vertical line extending the full length of the main sheet, said main sheet having a transverse line extending from said one lateral edge to said vertical line and located at a distance from the upper edge of the sheet equal to the length of said secondary sheet, whereby a space will be defined on said main sheet coextensive in area with said secondary sheet, said secondary sheet and said space having identical lines and indicia produced thereon to adapt said space for use as an order blank and said secondary sheet for use as a job sheet, said main sheet having other lines, columns and indicia produced on the face thereof between said vertical line and the second lateral edge of the main sheet to adapt said main sheet for use as a summary sheet, said main sheet also having a space below said transverse line and having produced in said last named space indicia identical with indicia on the job sheet at the upper end of the latter.

CYRIL D. PAGE.
FRANK A. BEHOUNEK.